(12) United States Patent
Otagaki et al.

(10) Patent No.: US 9,041,683 B2
(45) Date of Patent: May 26, 2015

(54) ELECTROSTATIC CAPACITY TYPE TOUCH SENSOR

(75) Inventors: Takayasu Otagaki, Hashima (JP); Atsuhiro Ichikawa, Mizuho (JP); Hiroya Ito, Ichinomiya (JP); Kazuhiro Hasegawa, Ichinomiyai (JP)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 571 days.

(21) Appl. No.: 13/029,655

(22) Filed: Feb. 17, 2011

(65) Prior Publication Data

US 2011/0199331 A1     Aug. 18, 2011

(30) Foreign Application Priority Data

Feb. 18, 2010   (JP) ................................. 2010-033724

(51) Int. Cl.
*G06F 3/044*     (2006.01)

(52) U.S. Cl.
CPC ..................................... *G06F 3/044* (2013.01)

(58) Field of Classification Search
None
See application file for complete search history.

(56) References Cited

U.S. PATENT DOCUMENTS

| | | | | |
|---|---|---|---|---|
| 3,796,951 | A * | 3/1974 | Joseph | 324/122 |
| 3,958,234 | A * | 5/1976 | Hoo | 345/182 |
| 4,737,768 | A * | 4/1988 | Lewiner et al. | 341/26 |
| 5,225,959 | A * | 7/1993 | Stearns | 361/283.1 |
| 5,329,288 | A * | 7/1994 | Kim | 345/63 |
| 5,378,069 | A * | 1/1995 | Bowen | 400/477 |
| 6,256,022 | B1 * | 7/2001 | Manaresi et al. | 345/174 |
| 8,279,180 | B2 * | 10/2012 | Hotelling et al. | 345/173 |
| 2001/0030524 | A1 * | 10/2001 | Yoshimura | 318/599 |
| 2001/0043167 | A1 * | 11/2001 | Sugahara et al. | 345/31 |
| 2002/0126091 | A1 * | 9/2002 | Rosenberg et al. | 345/161 |
| 2003/0103022 | A1 * | 6/2003 | Noguchi et al. | 345/77 |
| 2004/0095333 | A1 * | 5/2004 | Morag et al. | 345/173 |
| 2004/0155871 | A1 * | 8/2004 | Perski et al. | 345/174 |
| 2005/0007352 | A1 * | 1/2005 | Nathan et al. | 345/204 |
| 2005/0068044 | A1 * | 3/2005 | Peine et al. | 324/658 |
| 2005/0099188 | A1 * | 5/2005 | Baxter | 324/678 |
| 2005/0134292 | A1 * | 6/2005 | Knoedgen | 324/658 |
| 2005/0219169 | A1 * | 10/2005 | Chung et al. | 345/76 |
| 2005/0219206 | A1 * | 10/2005 | Schena et al. | 345/156 |
| 2006/0028407 | A1 * | 2/2006 | Chou | 345/76 |
| 2007/0163815 | A1 * | 7/2007 | Ungaretti et al. | 178/18.06 |
| 2007/0165406 | A1 * | 7/2007 | Wang | 362/253 |
| 2007/0171211 | A1 * | 7/2007 | Perski et al. | 345/173 |
| 2007/0176905 | A1 * | 8/2007 | Shih et al. | 345/173 |

(Continued)

FOREIGN PATENT DOCUMENTS

| | | | | | |
|---|---|---|---|---|---|
| JP | 2005141163 | A | * | 6/2005 | ............ G09G 3/30 |
| JP | 2005-190950 | | | 7/2005 | |
| WO | WO 2008082035 | A1 | * | 7/2008 | ............ G06F 3/038 |

*Primary Examiner* — Antonio Xavier

(57) ABSTRACT

The invention provides an electrostatic capacity type touch sensor that is not influenced by a parasitic capacitor formed between a sensor line connected to a touch sensor pad and other signal line and provides a stable sensor output. A sensor line connected to a touch sensor pad is connected to a non-inverting input terminal (+) of a charge amplifier. An LED is disposed in the touch sensor pad, and the cathode of the LED is connected to an LED signal line. Since the LED signal line is disposed adjacent to the sensor line, a parasitic capacitor is formed between the LED signal line and the sensor line. In order to keep the capacitance of this parasitic capacitor constant, a pull-up resistor is connected to the LED signal line. The LED signal line is biased to a power supply potential Vdd by the pull-up resistor.

18 Claims, 6 Drawing Sheets

(56) References Cited

U.S. PATENT DOCUMENTS

| | | | |
|---|---|---|---|
| 2007/0205977 A1* | 9/2007 | Kim | 345/102 |
| 2007/0241999 A1* | 10/2007 | Lin | 345/76 |
| 2007/0252005 A1* | 11/2007 | Konicek | 235/435 |
| 2007/0268272 A1* | 11/2007 | Perski et al. | 345/173 |
| 2008/0048997 A1* | 2/2008 | Gillespie et al. | 345/174 |
| 2008/0069413 A1* | 3/2008 | Riedijk et al. | 382/124 |
| 2008/0129898 A1* | 6/2008 | Moon | 349/12 |
| 2008/0158184 A1* | 7/2008 | Land et al. | 345/173 |
| 2009/0025987 A1* | 1/2009 | Perski et al. | 178/18.03 |
| 2009/0027349 A1* | 1/2009 | Comerford | 345/173 |
| 2009/0194672 A1* | 8/2009 | Tredwell et al. | 250/208.1 |
| 2009/0309517 A1* | 12/2009 | Gandara | 315/309 |
| 2010/0039458 A1* | 2/2010 | Nathan et al. | 345/698 |
| 2010/0079264 A1* | 4/2010 | Hoellwarth | 340/407.2 |
| 2010/0079401 A1* | 4/2010 | Staton | 345/174 |
| 2010/0079402 A1* | 4/2010 | Grunthaner et al. | 345/174 |
| 2010/0110040 A1* | 5/2010 | Kim et al. | 345/174 |
| 2010/0149126 A1* | 6/2010 | Futter | 345/174 |
| 2010/0156847 A1* | 6/2010 | No et al. | 345/175 |
| 2010/0187023 A1* | 7/2010 | Min | 178/18.09 |
| 2010/0245246 A1* | 9/2010 | Rosenfeld et al. | 345/163 |
| 2010/0253666 A1* | 10/2010 | Yamamoto | 345/211 |
| 2010/0315330 A1* | 12/2010 | Rhim et al. | 345/156 |
| 2010/0321305 A1* | 12/2010 | Chang et al. | 345/173 |
| 2011/0110538 A1* | 5/2011 | Chen et al. | 381/120 |
| 2011/0291977 A1* | 12/2011 | Moriwaki | 345/173 |
| 2012/0002455 A1* | 1/2012 | Sullivan et al. | 365/51 |
| 2012/0162176 A1* | 6/2012 | Kim et al. | 345/211 |

* cited by examiner

Charge accumulation mode

Charge transfer mode

ELECTROSTATIC CAPACITY TYPE TOUCH SENSOR

CROSS-REFERENCE OF THE INVENTION

This application claims priority from Japanese Patent Application No. 2010-033724, the content of which is incorporated herein by reference in its entirety.

BACKGROUND OF THE INVENTION

1. Field of the Invention

The invention relates to an electrostatic capacity type touch sensor.

2. Description of the Related Art

Conventionally, an electrostatic capacity type touch sensor is known as a data input device for various types of electronic devices such as a cellular phone, a portable audio device, a portable game device, a television, a personal computer and so on.

This type of electrostatic capacity type touch sensor performs touch detection by detecting a capacitance change of a capacitor that a touch sensor pad has by a touch or approach of a human finger, a tip of a pen or the like (hereafter, referred to as a human finger or the like) to the touch sensor pad.

A relevant technique is disclosed in the Japanese Patent Application Publication No. 2005-190950.

Since the electrostatic capacity type touch sensor detects a capacitance change of a capacitor that a touch sensor pad has, when a capacitance of a parasitic capacitor formed between a sensor line connected to the touch sensor pad and other signal line changes, there occurs a problem that the touch sensor detects the capacitance change.

For example, there is a case that an LED (the abbreviation of a Light Emitting Diode) is disposed on a touch sensor pad to light the LED in response to a touch detection.

In this case, when a sensor line connected to the touch sensor pad and a LED signal line are disposed close, a parasitic capacitor is formed between these. Then, when the capacitance of this parasitic capacitor changes due to a change of the electric state of the LED signal line (e.g. floating→L level→floating, floating→H level→floating), the electrostatic capacity type touch sensor detects the capacitance change of this parasitic capacitor, thereby causing a problem that the sensor output is unstable.

SUMMARY OF THE INVENTION

The invention provides an electrostatic capacity type touch sensor including: a touch sensor pad; a sensor line connected to the touch sensor pad; a charge amplifier having an input end connected to the sensor line and outputting an output voltage corresponding to a change of a capacitance of a capacitor that the touch sensor pad has; a signal line disposed adjacent to the sensor line; a parasitic capacitor formed between the sensor line and the signal line; and a bias resistor biasing the signal line to a first potential so as to avoid floating of the signal line.

DETAILED DESCRIPTION OF THE INVENTION

Figure 1A:
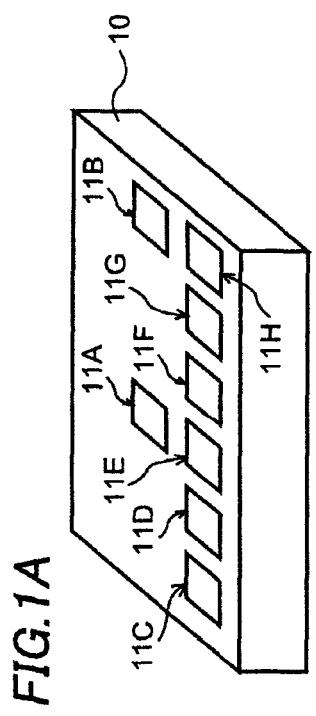
FIGS. 1A and 1B are perspective views showing the disposition of touch sensor pads of an electrostatic capacity type touch sensor of a first embodiment of the invention.
Figure 1B:
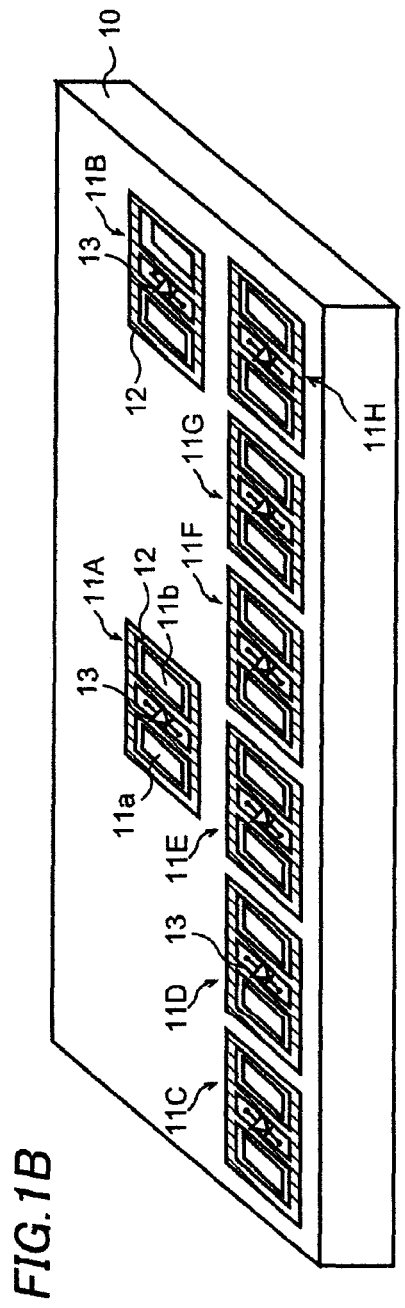

Hereafter, an electrostatic capacity type touch sensor of a first embodiment of the invention will be described referring to figures. FIGS. 1A and 1B are perspective views showing the disposition of the touch sensor pads of the electrostatic capacity type touch sensor. As shown in FIG. 1A, eight touch sensor pads 11A to 11H are disposed on a PCB substrate 10 as data input switches.

FIG. 1B shows the structure of the touch sensor pads 11A to 11H in detail. Each of the touch sensor pads 11A to 11H is configured including two sub touch sensor pads 11a and 11b surrounded by a common voltage line 12. An LED 13 is disposed between the two sub touch sensor pads 11a and 11b.

This LED 13 is surrounded by the common voltage line 12, and electrically shielded from the two sub touch sensor pads 11a and 11b by a dielectric material 27.

Although it is preferable that the LEDs 13 are disposed in the touch sensor pads 11A to 11H or above these respectively, the LEDs 13 may be disposed outside the touch sensor pads 11A to 11H.

Figure 2:
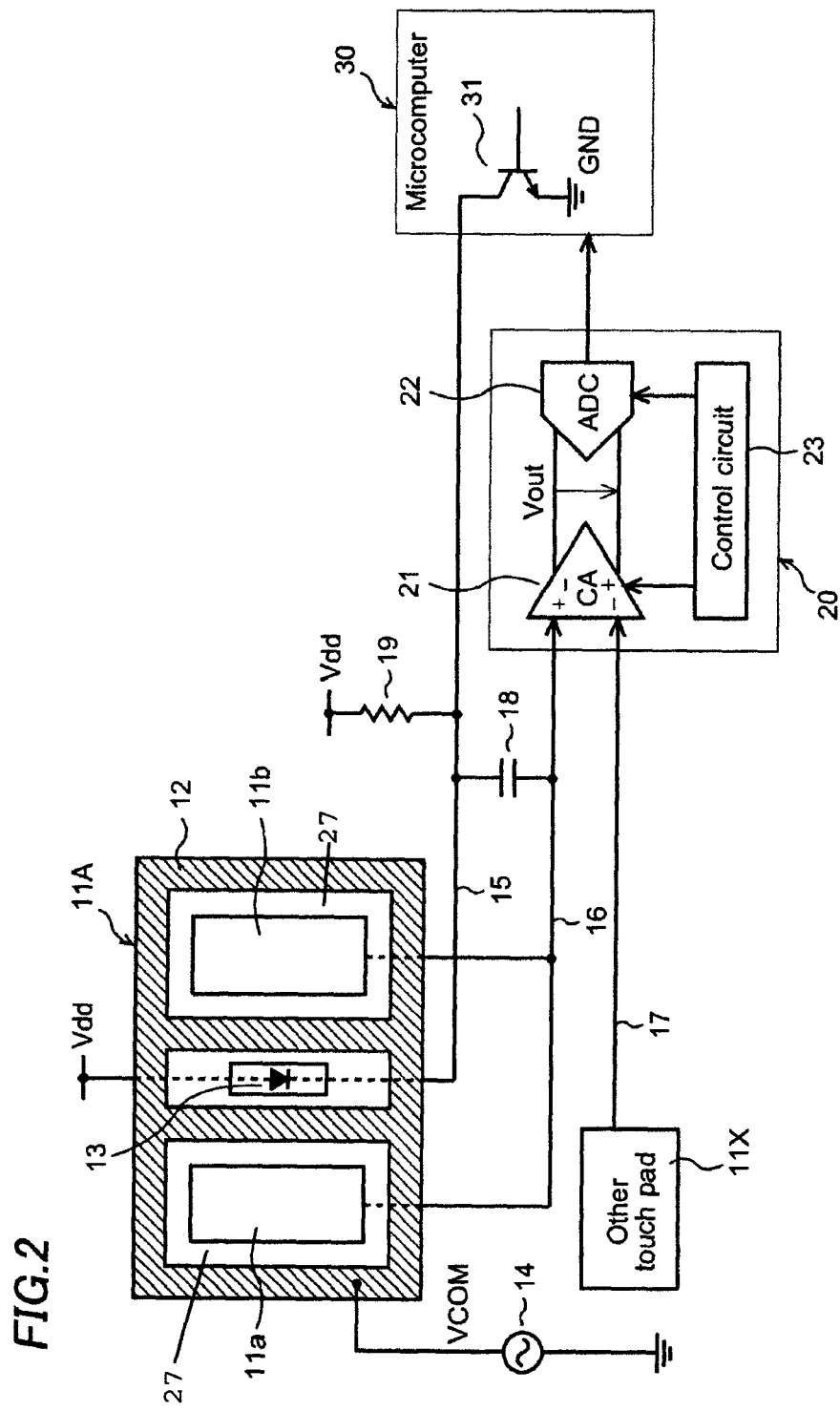
FIG. 2 is a view of the entire structure of the electrostatic capacity type touch sensor of the first embodiment of the invention.

FIG. 2 is a view of the entire structure of the electrostatic capacity type touch sensor. The electrostatic capacity type touch sensor is configured including the touch sensor pads 11A and 11X, the common voltage line 12, the LED 13, an alternating current power supply 14, an LED signal line 15, a sensor line 16, a sensor line 17, a parasitic capacitor 18, a pull-up resistor 19, a sensor IC 20 and a microcomputer 30. Among the touch sensor pads 11A to 11H, FIG. 2 shows only the touch sensor pad 11A and other touch sensor pad 11X (any one of the touch sensor pads 11B to 11H) that makes a pair with the touch sensor pad 11A.

The sensor IC 20 is configured including a differential type charge amplifier 21, an AD converter 22, and a control circuit 23 controlling the operation of the charge amplifier 21 and the AD converter 22. The microcomputer 30 is configured including a drive transistor 31 made of an NPN type bipolar transistor.

An alternating common voltage signal VCOM from the alternating current power supply 14 is applied to the common voltage line 12 surrounding the sub touch sensor pads 11a and 11b of each of the touch sensor pads 11A and 11X. The alternating current power supply 14 may be built in the sensor IC 20. The components of the electrostatic capacity type touch sensor described above may be mounted on one substrate or on several substrates separately.

The sub touch sensor pads 11a and 11b are commonly connected to the sensor line 16. A power supply potential Vdd is applied to the anode of the LED 13 of the touch sensor pad 11A. The cathode of the LED 13 is connected to the LED signal line 15.

The LED signal line 15 is disposed adjacent to the sensor line 16, between which a dielectric is disposed, and thus the parasitic capacitor 18 is formed between the LED signal line 15 and the sensor line 16. In order to keep the capacitance of this parasitic capacitor 18 constant, the pull-up resistor 19 is connected to the LED signal line 15. In other words, the LED signal line 15 is biased to the power supply potential Vdd through the pull-up resistor 19.

The sensor line 16 is connected to the non-inverting input terminal (+) of the charge amplifier 21. On the other hand, the sub touch sensor pads 11a and 11b of the other touch sensor pad 11X are commonly connected to the sensor line 17. The sensor line 17 is connected to the inverting input terminal (−) of the charge amplifier 21.

The charge amplifier 21 is configured so as to output an output voltage Vout corresponding to a difference (CA1−CA2=ΔC) between a capacitance CA1 of a capacitor C1 that the sub touch sensor pads 11a and 11b of the touch sensor pad 11A have and a capacitance CA2 of a capacitor C2 that the sub touch sensor pads 11a and 11b of the touch sensor pad 11X have. The details of an example of the structure of the charge amplifier 21 will be described below. In this case, the capacitor C1 of the touch sensor pad 11A is a capacitor formed between the sub touch sensor pads 11a and 11b and the common voltage line 12, and the parasitic capacitor 18 is added to this. The capacitor C2 of the touch sensor pad 11X is the same as this.

The AD converter 22 is a circuit that converts the output voltage Vout to a digital signal. The digital signal outputted from the AD converter 22 is inputted to the microcomputer 30. The collector of the drive transistor 31 built in the microcomputer 30 is connected to the end of the LED signal line 15. The emitter of the drive transistor 31 is grounded.

The microcomputer 30 controls the on and off of the drive transistor 31 based on the digital signal from the AD converter 22. In detail, the microcomputer 30 is configured so as to turn on the drive transistor 31 when the microcomputer 30 judges that the touch sensor pad 11A is touched with a human finger or the like.

Since the potential of the LED signal line 15 (the potential of the cathode of the LED 13) decreases when the drive transistor 31 turns on, a current flows through the LED 13 and the LED 13 lights. In this case, in order to decrease the potential of the cathode of the LED 13 to near the ground potential (0V) to increase a current flowing through the LED 13, it is preferable that the on-resistance of the drive transistor 31 is set lower than the resistance of the pull-up resistor 19.

Although not shown, the other touch sensor pad 11X is also configured in the same manner. In detail, an LED is provided to the touch sensor pad 11X, and the cathode of the LED is connected to an LED signal line. A parasitic capacitor is also formed between this LED signal line and the sensor line 17 in the same manner. Then a pull-up resistor and a drive transistor are also connected to the LED signal line, and the drive transistor is configured so that the on and off are controlled by the microcomputer 30 in the same manner.

Next, the operation of the electrostatic capacity type touch sensor described above will be described. First, in the initial state where the touch sensor pads 11A and 11X are not touched with a human finger or the like, when there is no difference between the capacitance CA1 of the capacitor C1 of the touch sensor pad 11A and the capacitance CA2 of the capacitor C2 of the touch sensor pad 11X, the output voltage Vout of the charge amplifier 21 is 0 V.

If there is a difference between the capacitances CA1 and CA2 in the initial state, the offset adjustment of the charge amplifier 21 is performed by the control circuit 23 so that the output voltage Vout of the charge amplifier 21 becomes 0. In this initial state, the microcomputer 30 judges that the touch sensor pad 11A is not touched with a human finger or the like, and thus the drive transistor 31 is in the off state. Since the LED signal line 15 is set at the power supply potential Vdd by the pull-up resistor 19, a current does not flow through the LED 13 and the LED 13 is in the unlighted state.

Then, when the touch sensor pad 11A is touched with a human finger or the like, for example, CA1>CA2 is established and thus the output voltage Vout of the charge amplifier 21 becomes a positive value. When the digital signal corresponding to the output voltage Vout exceeds a predetermined threshold, the microcomputer 30 judges that the touch sensor pad 11A is touched with a human finger or the like. Based on this, the drive transistor 31 turns on. When the drive transistor 31 turns on, the potential of the LED signal line 15 decreases from Vdd and thus the LED 13 lights.

It is noted that CA1>CA2 established when the touch sensor pad 11A is touched with a human finger or the like is in a case based on a dielectric model in which a human finger or the like is supposed to be a dielectric. In this case, since the number of electric flux lines from the touch sensor pad 11A toward the common voltage line 12 increases relatively, CA1>CA2 is established. On the other hand, in a case based on an electric field shield model in which a human finger or the like is supposed to be a grounded conductor, CA1<CA2 is established in the opposite manner. In this case, when the digital signal corresponding to the output voltage Vout decreases to less than a predetermined threshold, the microcomputer 30 judges that the touch sensor pad 11A is touched with a human finger or the like. The following description will be based on the dielectric model.

Then, when a human finger or the like is detached from the touch sensor pad 11A, the output voltage Vout of the charge amplifier 21 decreases. When the digital signal corresponding to the output voltage Vout decreases to less than a predetermined threshold, the microcomputer 30 judges that the touch sensor pad 11A is not touched with a human finger or the like. Based on this, the drive transistor 31 turns off. When the drive transistor 31 turns off, the potential of the LED signal line 15 turns back to Vdd and thus the LED 13 turns off the light.

In the electrostatic capacity type touch sensor of the embodiment, since the pull-up resistor 19 is connected to the LED signal line 15, the capacitance of the parasitic capacitor 18 is kept constant regardless of the on or off of the drive transistor 31. While the parasitic capacitor 18 functions to increase the capacitance CA1 of the capacitor C1 of the touch sensor pad 11A outwardly, the capacitance of the parasitic capacitor 18 is kept constant. Therefore, the output voltage Vout of the charge amplifier 21 does not change according to the on or off of the drive transistor 31. In particular, when the differential type charge amplifier 21 is used like in the embodiment, the detection sensibility for a capacitor change is high, and thus providing the pull-up resistor 19 has a large effect.

If the pull-up resistor 19 is not connected to the LED signal line 15, the capacitance of the parasitic capacitor 18 changes according to the on and off of the drive transistor 31 to cause an error. In detail, in the initial state, the drive transistor 31 turns off and the output of the drive transistor 31 has high impedance. In other words, the LED signal line 15 is in the electrically floating state, and thus the parasitic capacitor 18 is hardly formed.

Then, suppose that a human finger or the like touches the touch sensor pad 11A, the touch is detected by the microcomputer 30, and the drive transistor 31 turns on. When the drive transistor 31 turns on, the potential of the LED signal line 15 is fixed at near the ground potential (0V), for example, and thus the capacitance of the parasitic capacitor 18 increases. The increase of the capacitance of the parasitic capacitor 18 leads to an increase of the capacitance CA1 of the capacitor C1 of the touch sensor pad 11A, and the output voltage Vout of the charge amplifier 21 changes.

When a human finger or the like touches the other touch sensor pad 11X, the LED signal line of the other touch sensor pad 11X is pulled up by the pull-up resistor in the same manner as the touch sensor pad 11A. Therefore, the LED of the touch sensor pad 11X lights, and a stable output voltage Vout is obtained.

Figure 3A:
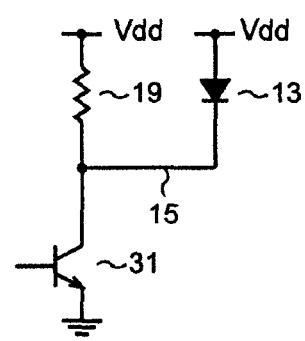
FIGS. 3A and 3B are partial circuit diagrams of the electrostatic capacity type touch sensor of the first embodiment of the invention.
Figure 3B:
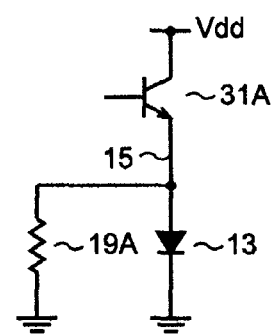

Although the connection structure of the LED 13 of the electrostatic capacity type touch sensor described above employs an anode common in which the power supply potential Vdd is applied to the anode of the LED 13 as shown in FIG. 3A, it may employ a cathode common in which the cathode of the LED 13 is grounded as shown in FIG. 3B. In this case, the LED signal line 15 is connected to the anode of the LED 13.

Then the LED signal line 15 is connected to a pull-down resistor 19A that biases the LED signal line 15 to the ground potential, instead of to the pull-up resistor 19. Furthermore, instead of the NPN type drive transistor 31, a PNP type drive transistor 31A is connected to the LED signal line 15. In this case, too, when the drive transistor 31A turns on, a current flows through the LED 13 and the LED 13 lights. Since the pull-down resistor 19A is provided, the LED signal line 15 does not electrically float even when the drive transistor 31A turns off, and thus the capacitance of the parasitic capacitor 18 is kept constant.

Although each of the touch sensor pads 11A and 11X has two sub touch sensor pads 11a and 11b in the electrostatic capacity type touch sensor described above, it may have only one sub touch sensor pad 11a.

Furthermore, the electrostatic capacity type touch sensor described above realizes a highly sensitive touch sensor by cancelling noise on the touch sensor pads 11A and 11X by employing a differential method. However, instead of the differential method, a single method charge amplifier that directly detects a change of the capacitance CA1 of the capacitor C1 of the touch sensor pad 11A may be used.

Figure 4:
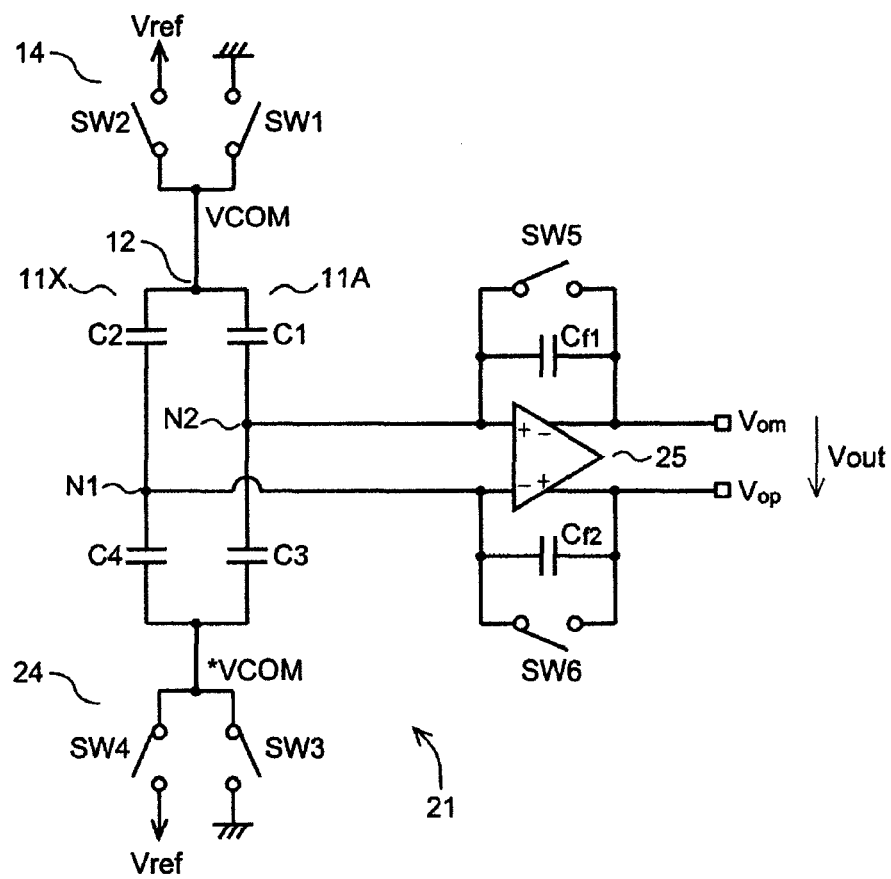
FIG. 4 is a circuit diagram of the charge amplifier of the electrostatic capacity type touch sensor.
Figure 5A:
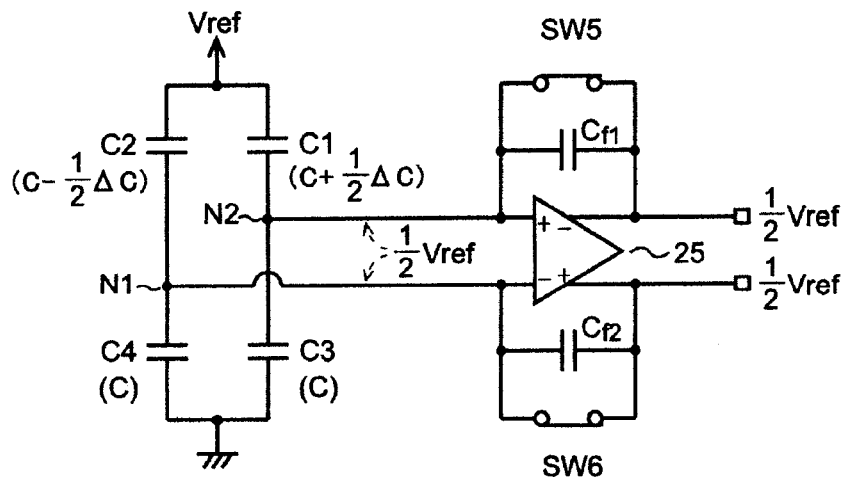
FIGS. 5A and 5B are circuit diagrams for explaining the operation of the charge amplifier of the electrostatic capacity type touch sensor.

Hereafter, an example of the structure of the charge amplifier 21 will be described in detail referring to FIGS. 4, 5A and 5B. One end of the capacitor C1 of the touch sensor pad 11A and one end of the capacitor C2 of the touch sensor pad 11X are commonly connected, and this corresponds to the common voltage line 12. An alternating common voltage signal VCOM from the alternating current power supply 14 is applied to the common voltage line 12 as described above.

In this case, the alternating current power supply 14 is made of switches SW1 and SW2 that are switched alternately. The alternating current power supply 14 outputs the ground voltage (0 V) when the switch SW1 turns on and the switch SW2 turns off, and outputs a reference potential Vref (positive potential) when the switch SW1 turns off and the switch SW2 turns on. In other words, the common voltage signal VCOM of the alternating current power supply 14 is a clock signal alternating between the reference potential Vref (H level) and 0 V (L level).

A capacitor C3 is connected in series with the capacitor C1, while a capacitor C4 is connected in series with the capacitor C2. It is preferauble that the capacitances CA3 and CA4 of the capacitors C3 and C4 are equal to the capacitances CA1 and CA2 of the capacitors C1 and C2 in the initial state. (CA1=CA2=CA3=CA4)

The capacitor C3 and the capacitor C4 are commonly connected, and an alternating voltage from an alternating current power supply 24 is applied to the connecting node of the capacitor C3 and the capacitor C4. The alternating current power supply 24 is made of switches SW3 and SW4 that are switched alternately. The alternating current power supply 24 outputs the ground potential (0 V) when the switch SW3 turns on and the switch SW4 turns off, and outputs the reference potential (positive voltage) when the switch SW3 turns off and the switch SW4 turns on. The alternating current power supply 24 outputs a common voltage signal *VCOM (a clock signal) that is opposite in phase to the signal of the alternating current power supply 14.

A wiring drawn out from a connecting node N2 as the connecting node of the capacitors C1 and C3 is connected to the non-inverting input terminal (+) of a differential amplifier 25, while a wiring drawn out from a connecting node N1 as the connecting node of the capacitors C2 and C4 is connected to the inverting input terminal (−) of the differential amplifier 25.

A feedback capacitor Cf1 is connected between the inverting output terminal (−) and the non-inverting input terminal (+) of the differential amplifier 25, while an identical feedback capacitor Cf2 is connected between the non-inverting output terminal (+) and the inverting input terminal (−) of the differential amplifier 25. Each of the feedback capacitors Cf1 and Cf2 has a capacitance Cf.

A switch SW5 is connected between the inverting output terminal (−) and the non-inverting input terminal (+) of the differential amplifier 25, while a switch SW6 is connected between the non-inverting output terminal (+) and the inverting input terminal (−) of the differential amplifier 25. The switches SW5 and SW6 are switched simultaneously. That is, when the switches SW5 and SW6 turn on, the inverting output terminal (−) and the non-inverting input terminal (+) of the differential amplifier 25 are short-circuited, and the non-inverting output terminal (+) and the inverting input terminal (−) of the differential amplifier 25 are short-circuited.

An output voltage from the inverting output terminal (−) of the differential amplifier 25 is Vom and an output voltage from the non-inverting output terminal (+) of the differential amplifier 25 is Vop. A voltage difference Vop−Vom between these is an output voltage Vout of the charge amplifier 21.

Next, the operations of the circuit structured as described above will be explained referring to FIGS. 5A and 5B. This circuit has a charge accumulation mode and a charge transfer mode. In the charge accumulation mode that is shown in FIG. 5A, the reference potential Vref is applied to the common connecting node of the capacitors C1 and C2 by turning off the switch SW1 and turning on the switch SW2 in the alternating current power supply 14. Also, simultaneously, the ground potential (0 V) is applied to the connecting node of the capacitors C3 and C4 by turning off the switch SW4 and turning on the switch SW3 in the alternating current power supply 24.

Also, the switches SW5 and SW6 turn on. With this, the inverting output terminal (−) and the non-inverting input terminal (+) of the differential amplifier 25 are short-circuited while the non-inverting output terminal (+) and the inverting input terminal (−) are short-circuited. As a result, a voltage at the node N1 (node of the wiring connected to the inverting input terminal (−)), a voltage at the node N2 (node of the wiring connected to the non-inverting input terminal (+)), a voltage at the inverting output terminal (−) and a voltage at the non-inverting output terminal (+) all become ½ Vref. Here, ½ Vref is a common mode voltage of the differential amplifier 25, which is a half of the reference potential Vref.

Figure 5B:
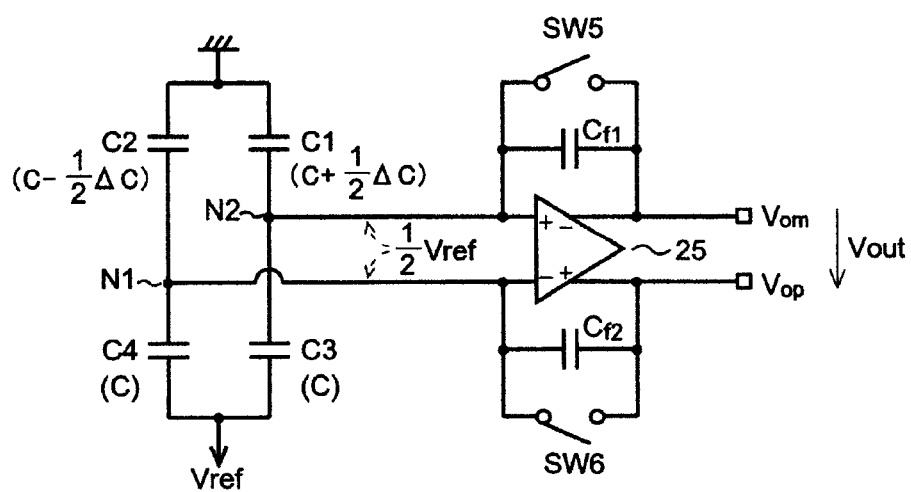

Next, in the charge transfer mode that is shown in FIG. 5B, the ground potential (0 V) is applied to the connecting node of the capacitors C1 and C2 by turning on the switch SW1 and turning off the switch SW2 in the alternating current power supply 14. Also, the reference potential Vref is applied to the connecting node of the capacitors C3 and C4 by turning on the switch SW4 and turning off the switch SW3 in the alternating current power supply 24. Also, the switches SW5 and SW6 turn off.

In this case, the capacitances CA3 and CA4 of the capacitors C3 and C4 are C, and the capacitances of the capacitors C1 and C2 in the initial state are C. When a human finger or the like approaches the touch sensor pad 11A, there is caused a capacitance difference ΔC between the capacitors C1 and C2. That is, CA1−CA2=ΔC. Then, equations CA1=C+½ ΔC and CA2=C−½ ΔC hold. It is noted that the initial state in this case is that a human finger or the like is equidistant from the two touch sensor pads 11A and 11X.

An amount of electric charges of the node N1 is represented by the following equation.

In the charge accumulation mode, $$\text{Amount of Electric Charges at } N1 = \left(C - \frac{1}{2}\Delta C\right) \cdot \left(-\frac{1}{2}Vref\right) + C \cdot \left(\frac{1}{2}Vref\right) + Cf \cdot 0 \quad \text{[Equation 1]}$$

where (C−½ ΔC)·(−½ Vref) represents an amount of electric charges stored in C2, C·(½ Vref) represents an amount of electric charges stored in C4 and Cf·0 (=0) represents an amount of electric charges stored in Cf2.

In the charge transfer mode, $$\text{Amount of Electric Charges at } N1 = \left(C - \frac{1}{2}\Delta C\right) \cdot \left(\frac{1}{2}Vref\right) + C \cdot \left(-\frac{1}{2}Vref\right) + Cf \cdot \left(Vop - \frac{1}{2}Vref\right) \quad \text{[Equation 2]}$$

where (C−½ ΔC)·(½ Vref) represents an amount of electric charges stored in C2, C·(−½ Vref) represents an amount of electric charges stored in C4 and Cf·(Vop−½ Vref) represents an amount of electric charges stored in Cf2.

[Equation 1]=[Equation 2], since an amount of electric charges at N1 is conserved in the charge accumulation mode and in the charge transfer mode according to the law of conservation of electric charge.

The following equation is obtained by solving [Equation 1]=[Equation 2] for Vop.

$$Vop = \left(1 + \frac{\Delta C}{Cf}\right) \cdot \frac{1}{2}Vref \quad \text{[Equation 3]}$$

Similarly, the following equation is obtained by applying the law of conservation of electric charge to the electric charges at the node N2 and solving the resulting equation for Vom.

$$Vom = \left(1 - \frac{\Delta C}{Cf}\right) \cdot \frac{1}{2}Vref \quad \text{[Equation 4]}$$

Vout is obtained from [Equation 3] and [Equation 4].

$$Vout = Vop - Vom = \frac{\Delta C}{Cf} \cdot Vref \quad \text{[Equation 5]}$$

As described above, it is understood that the output voltage Vout of the charge amplifier 21 varies proportionally to the capacitance difference ΔC between the capacitors C1 and C2.

Figure 6:
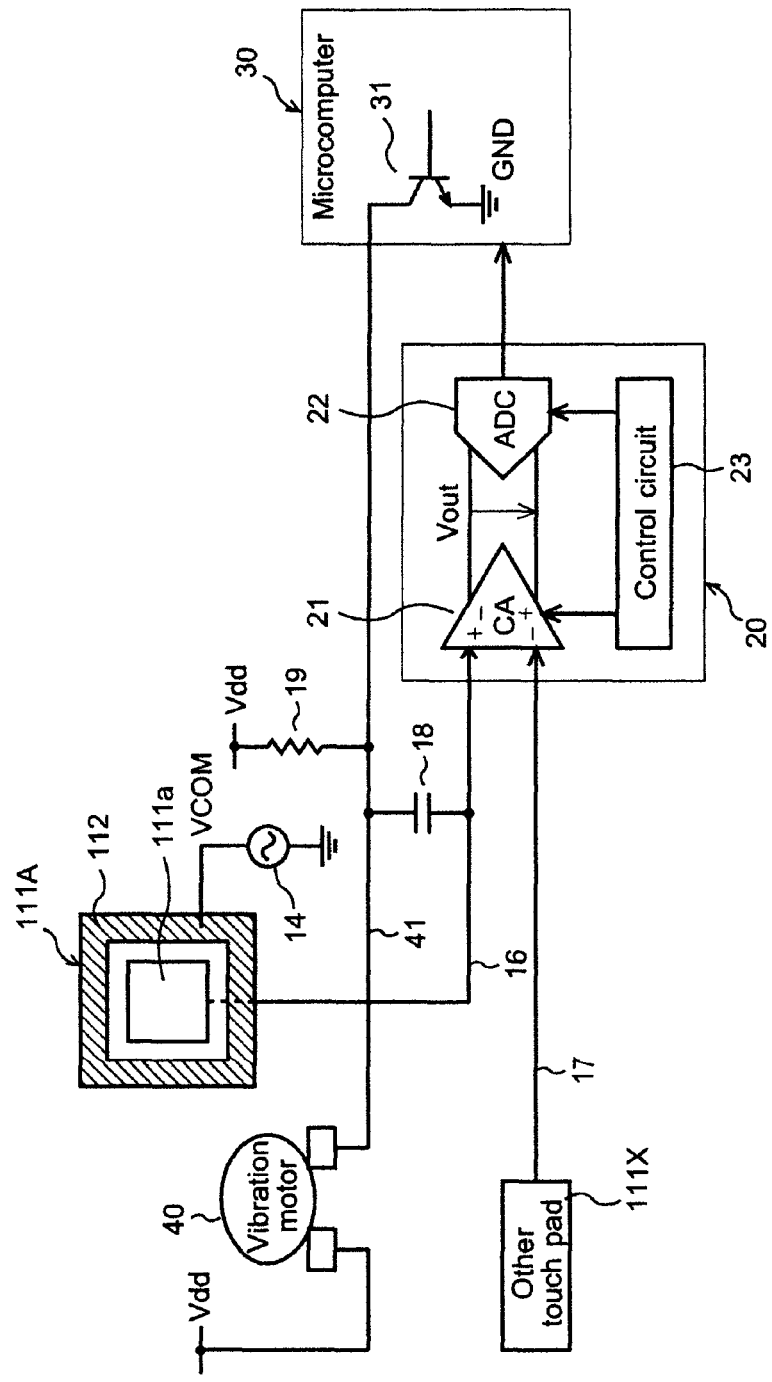
FIG. 6 is a view of the entire structure of an electrostatic capacity type touch sensor of a second embodiment of the invention.

Hereafter, an electrostatic capacity type touch sensor of a second embodiment of the invention will be described referring to FIG. 6. In the electrostatic capacity type touch sensor of the embodiment, a vibration motor 40 is used instead of the LED 13 of the first embodiment. A power supply potential Vdd is applied to one terminal of the vibration motor 40, and a vibration motor signal line 41 is connected to the other terminal.

The collector of the drive transistor 31 is connected to the vibration motor signal line 41. The emitter of the drive transistor 31 is grounded. Furthermore, the pull-up resistor 19 that biases the vibration motor signal line 41 to the power supply potential Vdd is connected to the vibration motor signal line 41. When the drive transistor 31 turns on, the potential of the vibration motor signal line 41 decreases from Vdd, a current flows through the vibration motor 40, and thereby the vibration motor 40 vibrates.

A touch sensor pad 111A is provided instead of the touch sensor pad 11A of the first embodiment. A sub touch sensor pad 111a is surrounded by a common voltage line 112, and an alternating common voltage signal VCOM from the alternating current power supply 14 is applied to the common voltage line 112. The touch sensor pad 111A has one sub touch sensor pad 111a. Since only one sub touch sensor pad 111a is provided, this may be referred to as a touch sensor pad. Other touch sensor pad 111X has the same structure as that of the touch sensor pad 111A. The other structure is the same as that of the first embodiment.

In the electrostatic capacity type touch sensor of the embodiment, in the same manner to the first embodiment, when the touch sensor pad 111A is touched with a human finger or the like and the digital signal corresponding to the output voltage Vout of the charge amplifier 21 exceeds a predetermined threshold, the microcomputer 30 judges that the touch sensor pad 111A is touched with a human finger or the like.

Based on the judgment of the microcomputer 30, the drive transistor 31 turns on. When the drive transistor 31 turns on, the potential of the vibration motor signal line 41 decreases from Vdd, a current flows through the vibration motor 40, and the vibration motor 40 vibrates. A user of the electrostatic capacity type touch sensor thus knows that the touch sensor pad 111A is touched with a human finger or the like.

In the electrostatic capacity type touch sensor of the embodiment, since the pull-up resistor 19 is connected to the vibration motor signal line 41, the capacitance of the parasitic capacitor 18 is kept constant regardless of the on or off of the drive transistor 31. While the parasitic capacitor 18 functions to increase the capacitance of the capacitor C1 of the touch sensor pad 111A outwardly, the capacitance of the parasitic capacitor 18 is kept constant. Therefore, in the same manner as the first embodiment, the output voltage Vout of the charge amplifier 21 does not change according to the on or off of the drive transistor 31.

The invention is not limited to the embodiments described above, and modifications are possible within the scope of the invention. For example, the effect of the stabled output voltage Vout of the charge amplifier 21 is obtained by connecting the pull-up resistor 19 (or a pull-down resistor) to a signal line as well as to the LED signal line 15 or the vibration motor signal line 41 when the signal line is disposed adjacent to the sensor line 16 and has a possibility of electrically floating when the impedance of an output of a drive circuit such as the drive transistor 31 becomes high.

In an electrostatic capacity type touch sensor of the invention, in order to avoid floating of a signal line (e.g. an LED signal line) disposed adjacent to a sensor line, a bias resistor that biases the signal line to a constant potential is provided. Therefore, the capacitance of the parasitic capacitor between the sensor line and the signal line is kept constant, thereby obtaining a stable sensor output.

What is claimed is:

1. An electrostatic capacity type touch sensor, comprising:
   a touch sensor pad;
   a sensor line connected to the touch sensor pad;
   a charge amplifier having a first input connected to the sensor line and outputting an output voltage corresponding to a change of a capacitance at the touch sensor pad;
   a signal line disposed adjacent to the sensor line that connects a vibration motor associated with the touch sensor pad that indicates touch detection to a drive transistor that drives the signal line between a first potential and a second potential in correspondence with the output voltage of the charge amplifier, wherein the vibration motor is connected between the first potential and the signal line;
   a parasitic capacitor formed between the sensor line and the signal line; and
   a bias resistor connected in parallel with the vibration motor associated with the touch sensor pad that biases the signal line to a first potential so as to avoid floating of the signal line.

2. The electrostatic capacity type touch sensor of claim 1, wherein the bias resistor and the drive transistor, serially connected to each other, are coupled between the first potential and the second potential.

3. The circuit of claim 1, wherein upon a change of capacitance of the first touch sensor pad occurring, the output of the charge amplifier changes such that the drive transistor activates the vibration motor.

4. An electrostatic capacity type touch sensor, comprising:
   a first touch sensor pad having two sub touch sensor pads;
   a second touch sensor pad;
   a light emitting element disposed between the two sub touch sensor pads of the first touch sensor pad;
   a first sensor line connected to the first touch sensor pad;
   a second sensor line connected to the second touch sensor pad;
   a first signal line connected to the light emitting element and disposed adjacent to the first sensor line;
   a parasitic capacitor formed between the first sensor line and the first signal line;
   a charge amplifier having a first input end connected to the first sensor line and a second input end connected to the second sensor line, the charge amplifier outputting an output voltage responsive to a difference between a capacitance of the first touch sensor pad and a capacitance of the second touch sensor pad;
   a bias resistor connected in parallel with the light emitting element that biases the first signal line to a first potential so as to maintain the parasitic capacitance constant; and
   a drive transistor driving the first signal line from the first potential to a second potential corresponding to the output voltage of the charge amplifier to turn on the light emitting element.

5. The electrostatic capacity type touch sensor of claim 4, wherein each of the two sub touch sensor pads is surrounded by the common voltage line, and wherein the component associated with the touch sensor pad is disposed between the two sub touch sensor pads.

6. The electrostatic capacity type touch sensor of claim 4, wherein each of the sub touch sensor pads is surrounded by, and electrically shielded from, a common voltage line.

7. The electrostatic capacity type touch sensor of claim 6, wherein the common voltage line is driven with an alternating current (AC) power supply.

8. An electrostatic capacity type touch sensor comprising:
   a touch sensor pad that comprises two sub touch sensor pads;
   a sensor line connected to the touch sensor pad;
   a charge amplifier having a first input connected to the sensor line and outputting an output voltage corresponding to a change of a capacitance at the touch sensor pad;
   a signal line disposed adjacent to the sensor line that connects a component associated with the touch sensor pad that indicates touch detection to a drive transistor that drives the signal line between a first potential and a second potential in correspondence with the output voltage of the charge amplifier, wherein the component is connected between the first potential and the signal line, and wherein the component associated with the touch sensor pad is disposed between the two sub touch sensor pads;
   a parasitic capacitor formed between the sensor line and the signal line; and
   a bias resistor connected in parallel with the component associated with the touch sensor pad that biases the signal line to a first potential so as to avoid floating of the signal.

9. The electrostatic capacity type touch sensor of claim 8, wherein the component associated with the touch pad sensor is a light emitting diode (LED).

10. The electrostatic capacity type touch sensor of claim 9, wherein the signal line is connected to a cathode of the LED and the first potential is applied to an anode of the LED.

11. The electrostatic capacity type touch sensor of claim 9, wherein the signal line is connected to an anode of the LED and the first potential is applied to a cathode of the LED.

12. The electrostatic capacity type touch sensor of claim 8, wherein the bias resistor and the drive transistor, serially connected to each other, are coupled between the first potential and the second potential.

13. The electrostatic capacity type touch sensor of claim 8, wherein the touch sensor pad is surrounded by, and electrically shielded from a common voltage line.

14. The electrostatic capacity type touch sensor of claim 13, wherein the common voltage line is driven with an alternating current (AC) power supply.

15. The electrostatic capacity type touch sensor of claim 8, wherein the charge amplifier has a second input that is connected to a different touch sensor pad.

16. A circuit for a touch sensor, comprising:
   a first touch sensor pad and a second touch sensor pad, wherein the first touch sensor pad comprises two sub touch sensor pads;
   a component associated with the first touch sensor pad to indicate touch detection at the first touch sensor pad and having a first terminal coupled to a first potential, wherein the component is a light emitting diode disposed between the two sub touch sensor pads;
   a first sensor line connected to the first touch sensor pad and a second sensor line connected to the second touch sensor pad;
   a first signal line connected to a second terminal of the component and disposed adjacent to the first sensor line, forming a parasitic capacitor between the first sensor line and the first signal line;

a charge amplifier having a first input connected to the first sensor line and a second input connected to the second sensor line, the charge amplifier outputting an output voltage corresponding to a difference between a capacitance of the first touch sensor pad and a capacitance of the second touch sensor pad wherein the capacitance of the second touch sensor pad acts as a reference;

a bias resistor connected in parallel with the component that biases the first signal line to the first potential so as to maintain the parasitic capacitance constant; and a drive transistor driving the first signal line from the first potential to a second potential in correspondence with the output voltage of the charge amplifier.

17. The circuit of claim 16, further comprising a common voltage line surrounding and electrically shielded from each of the sub touch sensor pads.

18. A circuit for a touch sensor, comprising:

a first touch sensor pad and a second touch sensor pad;

a vibration motor associated with the first touch sensor pad to indicate touch detection at the first touch sensor pad and having a first terminal coupled to a first potential;

a first sensor line connected to the first touch sensor pad and a second sensor line connected to the second touch sensor pad;

a first signal line connected to a second terminal of the vibration motor and disposed adjacent to the first sensor line, forming a parasitic capacitor between the first sensor line and the first signal line;

a charge amplifier having a first input connected to the first sensor line and a second input connected to the second sensor line, the charge amplifier outputting an output voltage corresponding to a difference between a capacitance of the first touch sensor pad and a capacitance of the second touch sensor pad wherein the capacitance of the second touch sensor pad acts as a reference;

a bias resistor connected in parallel with the component that biases the first signal line to the first potential so as to maintain the parasitic capacitance constant; and a drive transistor driving the first signal line from the first potential to a second potential in correspondence with the output voltage of the charge amplifier.

* * * * *